(12) United States Patent
Drayer

(10) Patent No.: US 6,941,013 B1
(45) Date of Patent: Sep. 6, 2005

(54) METHOD OF IMAGE BINARIZATION USING HISTOGRAM MODELING

(75) Inventor: Thomas Hudson Drayer, Laurel, MD (US)

(73) Assignee: The United States of America as represented by the National Security Agency, Washington, DC (US)

(*) Notice: Subject to any disclaimer, the term of this patent is extended or adjusted under 35 U.S.C. 154(b) by 678 days.

(21) Appl. No.: 10/063,423

(22) Filed: Apr. 22, 2002

(51) Int. Cl.[7] .............................................. G06K 9/00
(52) U.S. Cl. ...................... 382/168; 382/176; 382/237; 382/251; 358/462; 345/610
(58) Field of Search ........................ 382/164, 168–172, 382/176, 180, 237, 251; 358/3.21, 462; 345/610

(56) References Cited

U.S. PATENT DOCUMENTS 6,577,762 B1 * 6/2003 Seeger et al. ............... 382/173
6,876,760 B1 * 4/2005 Vaisberg et al. ............ 382/129

OTHER PUBLICATIONS

Taxt et al., "Segmentation of Document Images," IEEE T. Pattern Analysis & Machine Intelligence, vol. 11, No. 12, Dec. 1989, pp. 1322-1329.*
Sahoo et al. "Threshold Selection Based on Histogram Modeling," IEEE Int'l Conf. on Systems, Man and Cybernetics, vol. 1, □□ Oct. 18-21, 1992, pp. 351-356.*

* cited by examiner

*Primary Examiner*—Bhavesh M. Mehta
*Assistant Examiner*—Yubin Hung
(74) *Attorney, Agent, or Firm*—Stephen M. Bloor

(57) ABSTRACT

Method of image binarization using histogram modeling, which combines spatial resolution expansion with binarization in a single integrated process using a combination of spatial expansion, histogram modeling, classification, and quantization. Each pixel of the input image is expanded into a higher resolution image, and a count of the number of times each distinct gray scale intensity value occurs in the input image is calculated from pixel values of the input image and then modeled with an approximate histogram that is computed as the sum of weighted modeling functions. The input pixel values are then classified using the modeling functions and the results of the pixel classification are used to quantize the high resolution gray scale image to create a binary output image.

13 Claims, 1 Drawing Sheet

METHOD OF IMAGE BINARIZATION USING HISTOGRAM MODELING

BACKGROUND OF INVENTION

1. Field of the Invention

The present invention relates generally to methods for image processing, and more particularly to methods for binarization of gray-level images for text processing.

2. Description of the Related Art

The traditional method of transmitting and storing information is the paper document. Improvements in computer technology are fast replacing the paper document with digital document representations. The digital representation of document data allows for efficient indexing and retrieval, massive amounts of storage, immediate transmission, and storage for unlimited periods of time without degradation.

The transformation of paper documents into digital documents should be done in a way that preserves the information content, including text, graphics, and formatting. The process of transforming from paper document to a digital image is called optical scanning. Optical scanning is accomplished in a number of ways, typically by using electronic cameras or flatbed scanners. These technologies create a digital image of the document page.

A digital image consists of a two-dimensional array of values for which each individual value represents the light intensity reflected from a corresponding spatial location of the scanned document. The individual values in this two dimensional array are called pixel elements or pixels. Each pixel is represented by a digital value, with binary images using one binary digit (called a bit) per pixel and gray scale images using more than one binary digit per pixel.

Electronic storage and transmission of digital images uses the least memory or bandwidth if these pixels can each be represented as a single binary digit. While a document with black text on white paper might appear to have this binary characteristic already, real world documents have variations in the intensity of the image, pixels overlap areas of textual characters and areas with no textual characters, text and paper have variations in color and intensity, and many images contain pictures. For example, a page of magazine text may have only two levels of information, black text and the white background. However a gray-scale image of the same page will have many more intensity values due to factors such as non-uniform printing of characters contained in the text and shadows caused by lighting effects. Other types of documents, such as journal covers, generally include multiple levels of information, e.g., multiple colors, which are used in both the text and background of the document page.

If the different shades of gray on a page are to be represented by the digital document, the individual pixel elements must be capable of representing more than two distinct intensity values. Because of these many variations, pixels are usually sampled using a range of possible values, using more than one binary digit (bit) per pixel for representation. Typical gray scale images use eight bits per pixel, allowing $2^8$(256) possible gray values. Color images may use three color values for red, green, and blue values, of eight bits each, totaling 24 bits per pixel. To conserve resources or allow automated processing such as Optical Character Recognition (OCR), the intensity level for each pixel needs to be converted to a single binary digit for each pixel, a process defined as image binarization.

Several techniques have been used to perform image binarization. These techniques fall into two categories; those intended to render image graphics for human viewing/analysis and those intended for automated document processing. Techniques of the first class, such as the many dithering techniques, are generally not applicable to automatic document processing which is the subject of the present invention.

A binarized image should result in an image that, if viewed electronically, would still be consistent with the original paper document. The purpose of binarization is to yield an image suitable for automated processing, such as OCR. This requires that the binarized image be of high quality for legibility and best recognition by automated processes.

Image binarization techniques for automated document processing can be viewed as a classification problem, one in which each input gray scale pixel value is classified as either foreground or background. The single bit value for each pixel of the output binary image is assigned one value for foreground and the other for background.

Image binarization techniques for automated document processing can be further divided into two classes of methods. Methods in the first class use spatial derivative information to classify output pixels as either foreground or background. The algorithms determine rising and falling edge pixels in the input image using the spatial derivatives and then classify all pixels between the falling and rising edges as foreground. These techniques work well when there is sufficient spatial resolution and image contrast but are not appropriate for low resolution, low contrast, or very noisy images.

The present invention is a method of the second class where a direct transformation of the input gray scale pixel values to the output binary pixel value is accomplished. These methods typically calculate statistics of the image in the form of counts of the number of times each gray scale pixel value occurs in an image, called a histogram. This histogram information is used as a model of the Probability Distribution Function (PDF) for gray scale pixel intensity values. The histogram may be calculated either globally across the entire page, or within local regions of the image.

Thresholding is a common image processing operation, applied to gray-scale document images to obtain binary classification, which sets a bit to "true" for pixels equal to or above the threshold and to "false" for pixel values below the threshold. This binary decision defines a single bit value used to transform gray scale images into binary images. Generally speaking, this technique takes a gray scale image, in which each pixel has a corresponding multi-bit gray-level value, compares the gray-level to a threshold, and converts it into a binary value.

As gray scale documents may differ greatly in contrast, intensity, noise levels, and uniformity, different methods are defined to select a threshold that is appropriate for binarization of an input grays scale image. Many techniques examine the histogram to determine a suitable threshold. For example, a threshold may be set between the two largest peaks in a histogram.

The fastest and simplest thresholding technique is simply to determine a single global threshold for the entire image. An example of this technique is presented by Otsu, which defines a threshold that minimizes the in-class variance for a specific input image ("*A Threshold Selection Technique from Grey-level Histograms*," IEEE Trans. Systems, Man, and Cybernetics, Vol. 9, No. 1 (1979)). However, this and other global thresholding methods frequently result in loss or confusion of the information contained in the gray scale image. This is due to variations in background intensity across the global image. This information is embodied mainly in edges that appear in the image, and depends not so much on the absolute brightness of the pixels as on their relative brightness in relation to their neighbors. Thus, depending on the choice of threshold, a meaningful edge in the gray-level image will disappear in the binary image if the pixels on both sides of the edge are binarized to the same value. On the other hand, artifacts in the binary image with the appearance of edges may occur in an area of continuous transition in the gray-level image, when pixels with very similar gray-level values fall on opposite sides of the chosen threshold.

An adaptation to this technique is to allow the threshold to vary as the image changes. A new threshold is computed for differing sub-regions of the image. In a method described by Bernsen ("*Dynamic Thresholding of Grey-level Images*," Proc. Eighth Int'l Conf. Pattern Recognition (1986)) the maximum pixel value, $I_H$, and minimum pixel value, $I_L$, within a subregion of the image are found. A threshold value is computed as follows:

$$T_{val}=(I_H-H_L)/2 \text{ if } (I_H-I_L)>I; \text{ otherwise } T_{val}=I_L,$$

where the value of I defines a maximum tolerance on the variation in pixel values— thus indicating the presence of foreground. Otherwise, the threshold is set to the minimum to assign all input pixels the value for the background.

Another method described by Niblack (An Introduction to Digital Image Processing, (1986)) calculates the mean, $\mu$, and standard deviation, $\sigma$, of pixel values with a subregion of the image. A threshold value is computed as follows:

$$T_{val}=\mu+k\sigma.$$

Values of −0.2 for k and a subregion size of 15×15 are suggested.

Another pixel histogram method is that of Chow and Keneko ("*Automatic Detection of the Left Ventricle from Cineangiograms*," Computers and Biomedical Research, Vol. 5 (1972)). This method tests the histogram from non-overlapping input image subregions for bi-modality—the presence of two dominant peaks expected for white and black—and models the histogram with the sum of the two Gaussian distributions. A threshold is computed for all regions that are determined to be bi-modal. For regions that are not bi-modal, a threshold is interpolated from the thresholds of surrounding bi-modal regions. The individual thresholds are smoothed to eliminate outliers.

These techniques simply use statistical measures to determine a local or global threshold to be used for a two-class classification method. However, images with complicated background or images with a different relative proportion of background and foreground than expected will present challenges for these techniques. An alternative approach is to use models that adapt to differing image histograms to improve the classification.

An attempt to perform modeling of the histogram is introduced by Taxt ("*Segmentation of Document Images*," IEEE Trans. on Pattern Analysis and Machine Intelligence, Vol. 11, No. 12 (1991)). This technique uses a method similar to Chow and Kenko's method in an attempt to approximate the histogram of non-overlapping image sub-regions with the sum of two Gaussian distributions. However, Taxt's method uses an iterative algorithm to converge an initial guess of the Gaussian model parameters to the estimated solution and solves for the output binary pixel values using the most likely model for each input pixel value.

This intuitive approach of modeling with two models, one for background and one for foreground, works well for clearly bimodal histograms, but does not work well with more complicated distributions of gray scale intensities. Particularly in images of low spatial resolution, individual gray scale pixel values do not always simply correspond to areas of background or foreground. Pixels at the borders of characters will correspond to regions of both foreground and background.

A limitation of the above identified statistical techniques is that their classification of input gray scale pixel values into one of two narrowly defined classes is inadequate for an accurate description of the underlying process of gray scale image formation. Clearly, the differing gray scale values correspond to differing contributions of background and foreground to a single pixel value. Classifying a gray scale value as strictly one or the other represents a coarser quantization of the physical process, limiting performance of these approaches.

In addition to performing the binarization of image data, the current method integrates a spatial resolution enhancement process as well. If a higher resolution binary image is desired, a common approach is to first expand the spatial resolution to a new higher resolution gray scale image. There are several techniques available for expanding the spatial resolution, including replication, linear interpolation, or cubic spline interpolation. The high resolution image is then binarized using one of the existing techniques defined above. This combination of techniques is adequate, but does not accurately reflect the formulation of low resolution images. The differing gray levels represent different classes of pixels that should be classified differently—independently of their neighboring pixel values, rather than estimating gray levels using neighboring pixel values and classifying them into one of two classes. Thus the current method more accurately models the formation of the low resolution input image and should therefore provide better binarization performance.

SUMMARY OF INVENTION

In consideration of the problems detailed above and the limitations enumerated in the partial solutions thereto, an object of the present invention is to provide an improved method for image binarization that combines image binarization and spatial resolution expansion in an integrated process.

Another object of the present invention is to provide an improved method for image binarization that uses more than two models to characterize pixel intensity distributions.

Yet another object of the present invention is to provide a method for using the amount of spatial resolution expansion to define the minimum number of the underlying models that characterizing pixel intensity distributions.

Yet another object of the present invention is the method of making the above process adaptive to changing image conditions.

Yet another object of the present invention is to compute histograms that allow representation of both local and global image statistics.

In order to attain the objectives described above, according to an aspect of the present invention, there is provided a method of image binarization using histogram modeling whereby gray scale document images are converted into binary images for automated processing such as OCR.

The present invention combines spatial resolution expansion with binarization in a single integrated process. This is done with a combination of spatial expansion, histogram modeling, classification, and quantization.

First, each pixel of the input image is expanded into a p×q array of pixels, thereby expanding the horizontal and vertical spatial resolution of the input image. This higher resolution image may be created by predicting the individual values in the p×q array from the eight neighboring pixel in the input gray scale image, by linear interpolation, or cubic spline interpolation.

A count of the number of times each distinct gray scale intensity value occurs in the input image is calculated from all pixel values the input image, creating a histogram of pixel values. This histogram can be computed from all pixels in the image or from distinct j×k subregions in order to make the process adapt to changing image conditions. However, histograms of small subregions may not contain enough values to be statistically significant, so the histograms of small subregions can be augmented with an incomplete sampling of pixels from the remainder of the image.

This histogram is then modeled with an approximate histogram that is computed as the sum of weighted modeling functions. The number of modeling functions is defined by the size of the p×q array. Since the output binary image will consist of many p×q arrays of binary pixel values, for which each binary pixel value should represent either foreground or background, there are (p×q+1) possible values for the count of foreground pixels in each p×q array. A different modeling function is used to represent the distribution of input gray scale pixel values that will translate into each of these possible count values. It is possible to use more than one modeling function to represent the distribution of input gray scale pixel values that will translate into one possible count value. The modeling process finds the function parameters and weighting functions for each model. For example, if the functions are Gaussian, then the average and variance of each function is determined. This is done by exhaustive search or by iterative improvement of initial estimates of the weighting factors and function parameters.

The input pixel values are then classified using the modeling functions. Distributions of the models correspond to the probability distribution functions gray scale input pixel values that should create one of the (p×q+1) possible numbers of foreground pixels in each p×q matrix of pixels in the expanded input image. Each model is evaluated at the value of the current input gray scale pixel value, and the model function with the maximum value is selected for classification. This determines the number of foreground (and by extension the number of background) pixel values, m, in the output p×q array that corresponds to the input pixel value used for classification.

Finally, the results of the pixel classification are used with the high resolution gray scale image to create the output image. The classification determines the number, m, of foreground pixels in each p×q array of the output image. To determine which of the p×q pixels to set to foreground, the m darkest (lowest intensity) pixels of the high resolution image pixels are set to the value for foreground in the corresponding p×q region of the high resolution binary output image. This is done for all p×q regions to compute the entire high resolution binary output image.

The aforementioned features, objects, and advantages of this method over the prior art will become apparent to those skilled in the art from the following detailed description and accompanying drawings.

BRIEF DESCRIPTION OF DRAWINGS

My invention can best be understood when reading the following specification with reference to the accompanying drawings, which are incorporated in and form a part of the specification, illustrate alternate embodiments of the present invention, and together with the description, serve to explain the principles of the invention. In the drawings.

DETAILED DESCRIPTION

Figure 1:
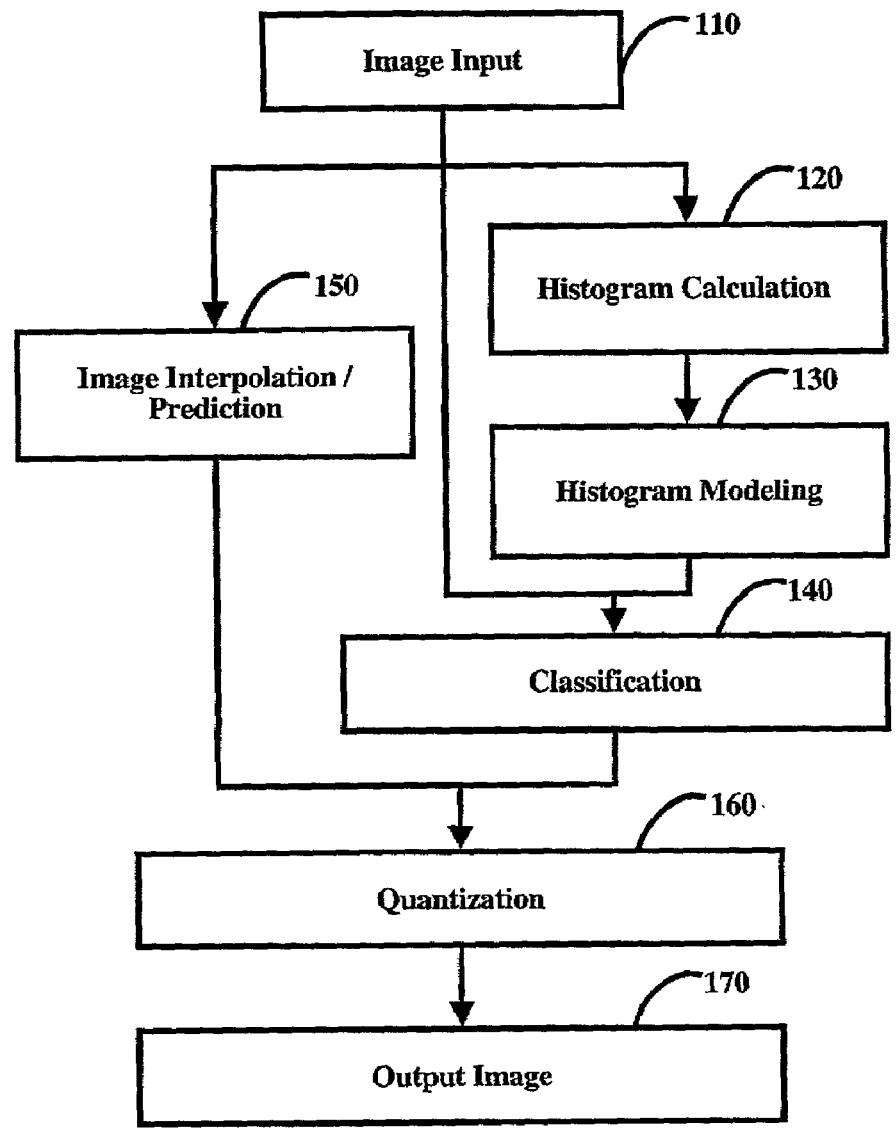
FIG. 1 is a flow chart showing the method of image binarization using histogram modeling.

As shown in FIG. 1, the first step, 110, of the present method of image binarization using histogram modeling is to obtain a gray scale digital image, either by scanning a document page or other means. This input gray scale image consists of a two-dimensional array of multiple-bit values for which each individual value represents the light intensity reflected from a corresponding spatial location of a scanned document. The scanned document is considered to contain both foreground and background luminance values, typically corresponding to the dark foreground regions and light background. The individual values in this two dimensional array are called pixel elements or pixels. The value of pixels represents either the foreground value, the background value, or a value proportional to the percentage of foreground and background in the corresponding spatial location scanned into a pixel value. Each pixel is represented by an n-bit digital value, with binary images using one binary digit per pixel (n=1) and gray scale images using more than one binary digit per pixel (n>1). Each pixel value of a color image is represented by a vector, typically of dimension three, of multi-bit (n>1) values. Individual scalar elements of the color pixel vector typically represent sampling of light intensity from different wavelength ranges such as the wavelengths of red, green, and blue light.

This input gray scale image, I(x, y), where x and y indicate the position in the two dimensional array, may be obtained directly, through optical scanning, or from other means such as synthetic generation using computer image editing/manipulation tools. In the preferred embodiment input images are gray scale, however in alternate embodiments color images could be obtained and processed directly or transformed into gray scale using any number of known techniques, such as channel averaging. It is understood that in any of the following discussions images defined to be gray scale could be either gray scale or color images.

The final step, 170, of the present method outputs the result of this process, a high resolution binary output image, $I_O$ (a, b). This image has a higher spatial resolution than the input image, meaning that the size (number of pixels) of the output image is greater than the size of the input image. Further, the output image must be a binary image, using a single 1-bit value for each pixel.

In step 150, a high resolution gray scale image, $I_H$ (a, b), is created from the input image, I(x, y). This high resolution image will have higher spatial resolution than the input gray scale image, and is of the same dimension as the output high resolution binary image, produced in step 160 and output in step 170. In creating this higher resolution gray scale image, $I_H$ (a, b), each pixel of the input image is represented by a p×q array of pixels in the higher spatial resolution image. As an exemplar when both p and q take the value 2, each pixel of the input image will be represented by four pixels, a 2×2 array, in the high spatial resolution image. In this exemplar any pixel location in the input image I(x, y) will be represented by the four pixel values $I_H(2x, 2y)$, $I_H(2x+1, 2y)$, $I_H(2x, 2y+1)$, $I_H(2x+1, 2y+1)$.

Pixel values in the high resolution gray scale image are calculated from the pixels in the input image. In the preferred embodiment, each pixel value in the higher spatial resolution image is calculated from neighboring input image pixel values using linear predictors. As an exemplar where p and q both take the value 2, the four pixels in the higher spatial resolution image that represent a single pixel $I(x, y)$ in the input image can be calculated from adjacent pixel values in the input image as follows:

$$I_H(2x,2y)=I(x-1, y-1)+I(x-1, y)+I(x, y-1)$$

$$I_H(2x+1,2y)=I(x, y-1)+I(x+1, y-1)+I(x+1, y)$$

$$I_H(2x,2y+1)=I(x-1, y)+I(x-1, y+1)+I(x, y+1)$$

$$I_H(2x+1,2y+1)=(x, y+1)+I(x+1, y+1)+I(x+1, y)$$

Alternate embodiments can use more sophisticated predictors weighting each pixel differently or using different input pixel locations, or may use interpolative techniques to calculate the high resolution image.

The present method of image binarization creates a histogram of the gray scale pixel values in the input image, step 120. The histogram counts the number of times each distinct gray scale intensity occurs in the input image. This histogram, $H(z)$, represents the count of pixel values from the minimum possible gray scale value $z_{min}$ to the maximum $z_{max}$. The value z may be either a scalar, as in gray scale images, or a vector, as in color images. In the preferred embodiment, this histogram is computed from all pixels in the entire input image, called a global histogram. In alternate embodiments, the histogram may be computed from a sub-region of the input image, called a local histogram. In another alternate embodiment, the count values of the histogram may correspond to the number of times gray scale intensity values in a range of values occur in the input image. This is useful when there are a large number of distinct pixel values, such as with 24-bit color images that may have over 16 million possible distinct colors and therefore more than 24 million count values in the histogram.

The histogram of the number of times each specific gray scale intensity occurs is then modeled, step 130, by an approximate histogram $H_M(z)$, that is computed as the sum of at least (p×q+1) functions as defined in the following:

$$H(z) \cong H_M(z) = \sum_{i=1}^{pq+1} \alpha_i f_i(z, \phi_i)$$

In this equation, the $f_i(z, \phi_i)$ are the individual functions with parameters $\phi_i$, and the $\alpha_i$ scale factors weight the contribution of each individual function. Since each pixel in the input image results in (p×q) pixels in the high resolution binary output image of step 160, there will be (p×q+1) possible combinations of counts for background and foreground pixels in the p×q region. As an exemplar where both p and q take the value 2, the four pixels of a 2×2 array in the high resolution binary output image can have 0, 1, 2, 3, or 4 foreground (or alternatively background) pixels.

Each of the individual functions defined above should model the contribution to the original histogram $H(z)$ of input gray scale image pixel intensities for one of the (p×q+1) possibilities, each representing the ratio of foreground to total area of the corresponding spatial pixel area scanned into the pixel value. As an exemplar where p and q both take the value 2, there will be at least five individual functions to model the distribution of gray scale pixel values in the input image that create 0, 1, 2, 3, or 4 foreground pixels in the high resolution binary output image, representing ratios of 0:4, 1:4, 2:4, 3:4 and 4:4 foreground to total area. There may be additional models, if multiple models are used for the distribution of one of the (p×q+1) possibilities, so the number of models is defined to be $K_{Mod} \geq (p \times q)$.

In the preferred embodiment each of the individual functions are defined as Gaussian in accordance with the following:

$$f(z, \phi_i) = e^{(z-\mu_i)^2/\sigma_i^2}$$

In this equation, individual functions are not indexed because they have the same form, and the function parameters, $\phi_i$, are the mean, $\mu_i$, and variance, $\sigma_i$, of each Gaussian function.

Modeling of the histogram involves searching for or calculating the number of models, the parameters for all the individual functions, and the scale factors that minimize the modeling error, the difference between $H(z)$ and $H_M(z)$. This modeling error can be computed in a number of ways. In the preferred embodiment, the modeling error is computed as the sum of absolute differences between the two histograms, defined as follows:

$$D(H, H_M) = \sum_{z=z_{min}}^{z_{max}} abs[H(z) - H_M(z)]$$

In the above equation, the function abs[j] returns the absolute value of the input variable j. There are many possible techniques for searching for function parameters that minimize the modeling error, further, it is not required to find the exact parameters that minimize the modeling error. In the preferred embodiment, approximate solutions are used. A search is performed on the space of function parameters and scale factors and set of parameters and scale factors that minimize the modeling error from the limited set of values searched is used.

Next, step 140, the input gray scale pixel values (from step 110) are classified into one of (p×q+1) classes, one class for each of the possibilities for the number of output foreground pixels as determined in step 130. In the preferred embodiment, for an input gray scale pixel value $z=I(x,y)$, the model with the highest value at intensity value z, MAX $\{\alpha_i f_i(z, \phi_i); 0<i<=K_{Mod}\}$, determines the classification of the pixel, and therefore the number of foreground pixels, m(x, y), in the corresponding p×q region of the output binary image.

Next, step 160, performs quantization of the high resolution gray scale image to produce a high resolution binary image, the output of the image binarization using the histogram modeling process. In a prior step 140, the number of foreground pixels m(x,y) in each p×q region of the output image was determined by classifying input gray scale image pixels. This step, 160, uses the high resolution gray scale image to determine how to distribute the m foreground pixels among the pixels in the corresponding p×q array of the output binary image. This is trivial when m(x,y) is equal to 0 or p×q. In these cases, all pixels are either foreground or background. Other cases are determined by the pixel values in the high resolution gray scale image. In the preferred embodiment, each p×q region in the high resolution gray scale image is examined, the m(x,y) "darkest" pixels are identified, and their corresponding locations in the binary output image are set to the foreground value. The remaining pixels are set to the background value.

In the preferred embodiment defined above, a single histogram is computed from all pixels in the input image and used for the modeling and classification processes. In an alternative embodiment of the invention, sub-regions are histogramed, modeled, and classified individually, allowing the process to adapt to changing input image conditions, such as lighting intensity or image contrast. In this alternate embodiment, a separate histogram is used for each j×k sub-region of the input image. Since the output image is (p×q) larger than the input image, each individual histogram will be used to calculate an (j×p)×(k×q) region of the output image. In an alternative embodiment, the histogram is not computed exclusively from the pixel values in the same j×k region of the input image as used for the histogram, modeling, and classification processes. In one alternate embodiment, all pixels of distance r to the right or left and s above or below the sub-region also contribute to the histogram of j×k sub-regions. In this embodiment, a region of size (j+2, r)×(k+2s), centered on the j×k sub-region, is used to calculate the individual histogram used for modeling and classification of each j×k subregion of the input image.

In another alternate embodiment, each individual histogram is calculated from all pixels in the j×k sub-region and a sampling of other pixels in the image. Differing methods can be used to determine which additional pixels to sample for contribution. In one exemplar, a lower resolution version of the input image may be created from the input image using subsampling, possibly smoothing the input image before subsampling. Pixel values from a j×k sub-region of this subsampled image, centered at the location of the j×k sub-region in the original image, can also be added to the histogram to allow pixels outside the original subregion to contribute. This concept can be extended to multiple subsampled images at successively lower resolution, each sampled to allow a wider, but less significant, contribution to the histogram of the j×k sub-region.

Although various preferred and alternate embodiments of the present invention have been described herein in detail to provide for complete and clear disclosure, it will be appreciated by those skilled in the art, that variations may be made thereto without departing from the spirit of the invention or the scope of the appended claims.

What is claimed is:

1. A method of image binarization using histogram modeling, comprising the steps of:
    from a source having foreground and background luminance areas, obtaining a gray scale digital input image comprising a plurality of pixels having respective gray scale values corresponding to the average intensity of the source over a particular pixel location;
    creating a higher spatial resolution gray scale image comprising a plurality of p×q arrays of pixels, one of each of said p×q arrays for each of the pixels in said gray scale digital input image, with the gray scale values of each of said pixels in each of said p×q arrays of pixels calculated from the gray scale values of the pixels of said gray scale digital input image;
    creating a higher spatial resolution binary image comprising a plurality of p×q arrays of pixels, one of each of said p×q arrays for each of the pixels in said gray scale digital input image, with each pixel in each of said p×q arrays in said higher spatial resolution binary image having a binary value representing foreground or background;
    creating (p×q+1) classes of number m, where m is the possible numbers of pixels in each of said p×q array of pixels in said higher spatial resolution binary image having a binary value representing foreground;
    creating a histogram of the number of each gray scale value for the plurality of pixels in said gray scale digital input image;
    modeling said histogram with (p×q+1) functions, labeled function m, such that said function m of each of said functions models the portion of said histogram contributed by pixels from said gray scale digital input image having gray scale values proportional to the ratio of the source foreground luminance area to the source foreground luminance area plus the source background luminance area, in the corresponding particular pixel location, of m/(p×q);
    assigning each of said plurality of gray scale digital input image pixel values to one of said classes, such that the said gray scale digital input image pixel value is most likely to belong to the portion of said histogram modeled by the corresponding function; and
    for each of said p×q array of pixels in said higher spatial resolution binary image, setting n pixels to foreground, where n is the class assigned the corresponding gray scale digital input image pixel, and the particular n pixels are determined using the corresponding p×q array in the higher spatial resolution gray scale image.

2. The method of claim 1 further comprising the step of transforming a color image into a gray scale digital input image.

3. The method of claim 1 wherein said step of creating a higher spatial resolution gray scale image comprising a plurality of p×q arrays of pixels, one of each of said p×q arrays for each of the pixels in said gray scale digital input image, with the gray scale values of each of said pixels in each of said p×q arrays of pixels calculated from the gray scale values of the pixels of said gray scale digital input image uses the values of the neighboring pixels in said gray scale digital input image when calculating the gray scale values of each of said pixels in each of said p×q arrays of pixels.

4. The method of claim 1 wherein said step of creating a higher spatial resolution gray scale image comprising a plurality of p×q arrays of pixels, one of each of said p×q arrays for each of the pixels in said gray scale digital input image, with the gray scale values of each of said pixels in each of said p×q arrays of pixels calculated from the gray scale values of the pixels of said gray scale digital input image uses the values of other pixels in said gray scale digital input image when calculating the gray scale values of each of said pixels in each of said p×q arrays of pixels.

5. The method of claim 4 wherein said step of calculating the gray scale values of each of said pixels in each of said p×q arrays of pixels uses linear predictors.

6. The method of claim 4 wherein said step of calculating the gray scale values of each of said pixels in each of said p×q arrays of pixels uses linear interpolation.

7. The method of claim 4 wherein said step of calculating the gray scale values of each of said pixels in each of said p×q arrays of pixels uses spline interpolation.

8. The method of claim 1 wherein said step of creating a histogram of the number of each gray scale value for the plurality of pixels in said gray scale digital input image uses the values for all of said pixels in the plurality of pixels in said gray scale digital input image.

9. The method of claim 1 wherein said step of creating a histogram of the number of each gray scale value for the plurality of pixels in said gray scale digital input image uses the values of said pixels in the plurality of pixels in part of said gray scale digital input image.

10. The method of claim 1 wherein said functions are comprised of Gaussian functions.

11. The method of claim 1 wherein said step of modeling said histogram with (p×q+1) functions further comprises the step of minimizing the difference between the sum of all of said functions and the histogram of the number of each gray scale value for the plurality of pixels in said gray scale digital input image.

12. The method of claim 1 wherein said step of creating a histogram of the number of each gray scale value for the plurality of pixels in said gray scale digital input image uses a range of input gray scale values for each value in the histogram.

13. The method of claim 1 wherein said step of:

creating a higher spatial resolution gray scale image comprising a plurality of p×q arrays of pixels, one of each of said p×q arrays for each of the pixels in said gray scale digital input image, with the gray scale values of each of said pixels in each of said p×q arrays of pixels calculated from the gray scale values of the pixels of said gray scale digital input image;

can be accomplished concurrently with said steps of:

creating a histogram of the number of each gray scale value for the plurality of pixels in said gray scale digital input image;

modeling said histogram with (p×q+1) functions, labeled function m, such that said function m of each of said functions models the portion of said histogram contributed by pixels from said gray scale digital input image having gray scale values proportional to the ratio of the source foreground luminance area to the source foreground luminance area plus the source background luminance area, in the corresponding particular pixel location, of m/(p×q); and assigning each of said plurality of gray scale digital input image pixel values to one of said classes, such that the said gray scale digital input image pixel value is most likely to belong to the portion of said histogram modeled by the corresponding function.

* * * * *